Sept. 29, 1964     D. GLASER ETAL     3,151,248
PHOTOSENSITIVE LIGHT GUN

Filed Dec. 19, 1960     4 Sheets-Sheet 1

INVENTORS
DAVID GLASER
GEORGE P. HLAVKA
BY Robert A. Green
ATTORNEY

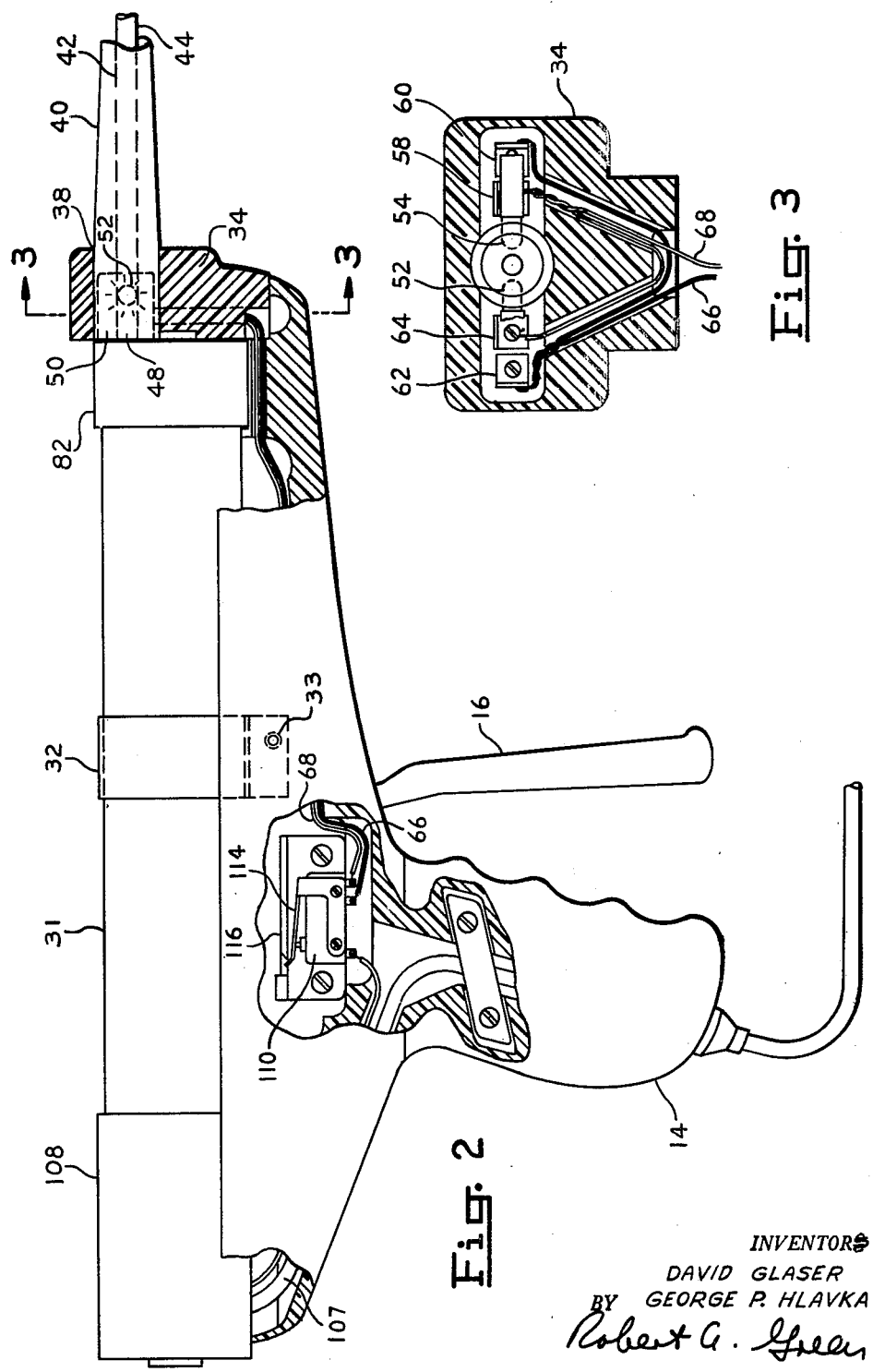

Sept. 29, 1964 D. GLASER ETAL 3,151,248
PHOTOSENSITIVE LIGHT GUN
Filed Dec. 19, 1960 4 Sheets-Sheet 3
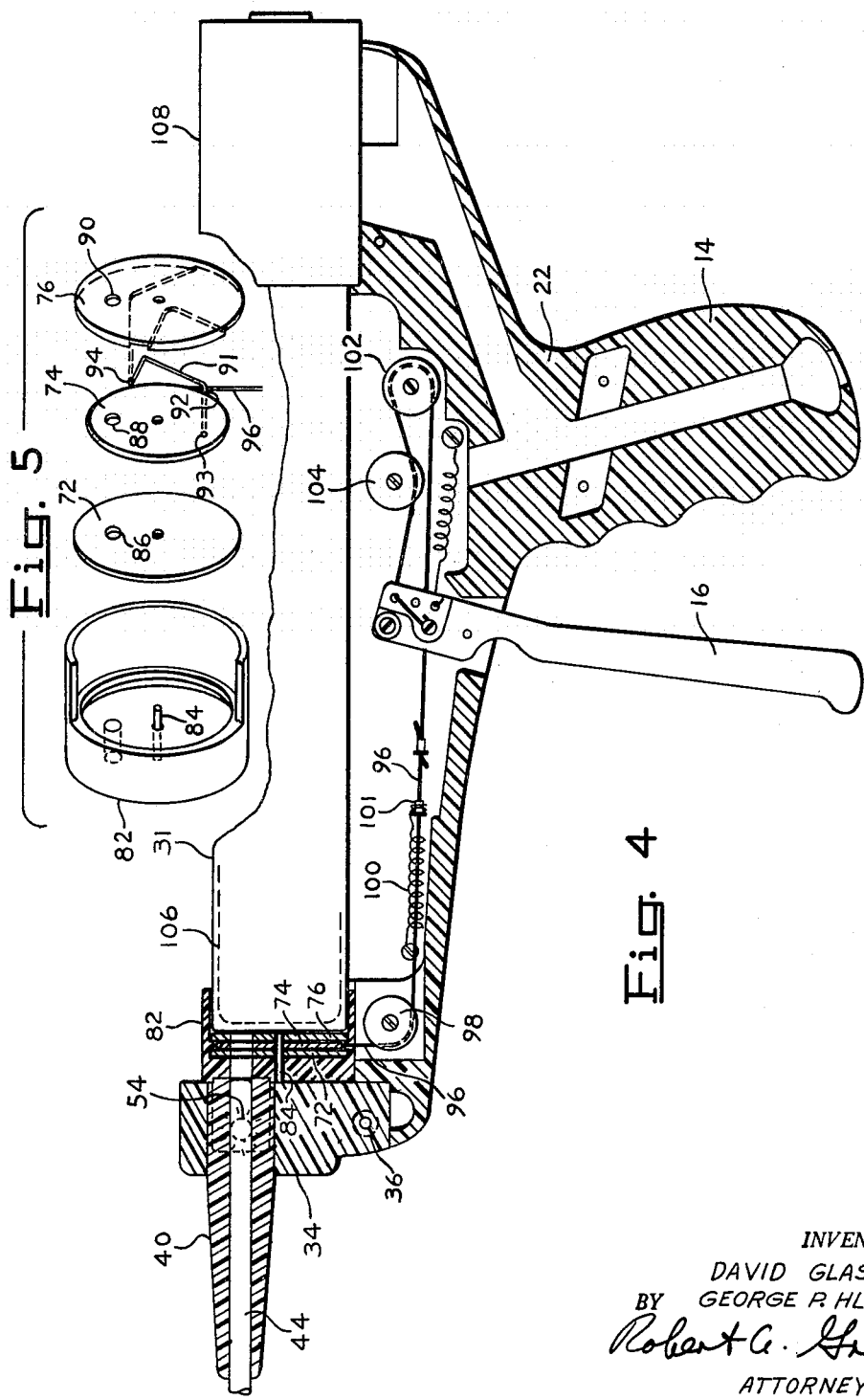
INVENTORS
DAVID GLASER
BY GEORGE P. HLAVKA
Robert G. Green
ATTORNEY

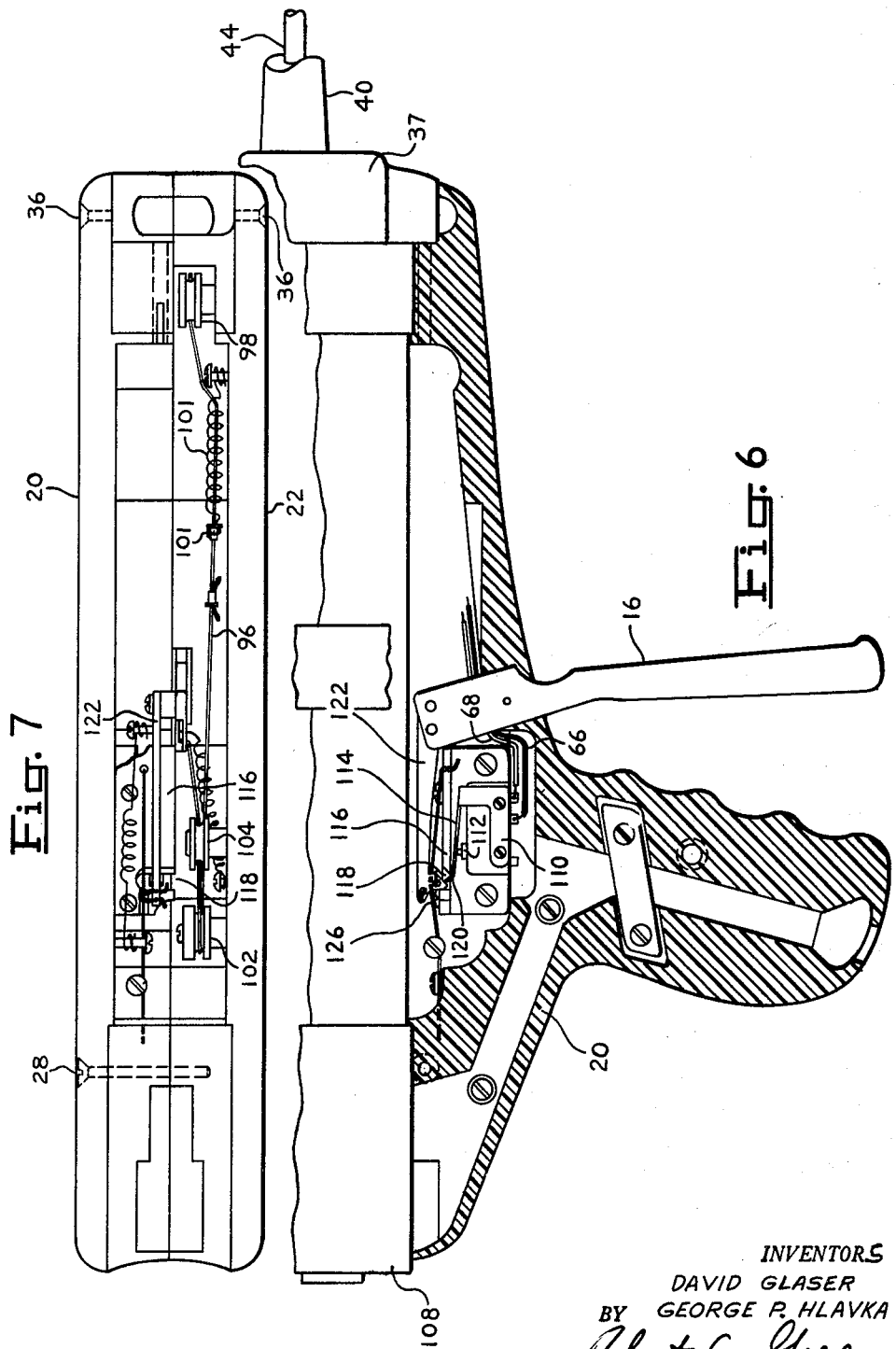

United States Patent Office 3,151,248
Patented Sept. 29, 1964

3,151,248
PHOTOSENSITIVE LIGHT GUN
David Glaser, Green Brook, and George P. Hlavka, Warren Township, N.J., assignors to Burroughs Corporation, Detroit, Mich., a corporation of Michigan
Filed Dec. 19, 1960, Ser. No. 76,956
4 Claims. (Cl. 250—227)

This invention relates to electro-optical apparatus known as light guns.

Light guns are electro-optical devices which are adapted to receive or read light signals and convert the light signals into electrical signals for use in different types of auxiliary apparatus. Light guns are particularly adapted for use in reading light information which appears on the face of a cathode ray tube in a radar or other intelligence communication system.

Some of the problems which arise in the use of a light gun concern the sensitivity of the gun to ambient light and the stability of the gun to select and read light information. Thus, a light gun should not respond to the light present in the room or space in which the gun and associated apparatus are operated, and the gun should not be affected by light information near the information area which is to be read. In addition, a light gun should be easy to focus on an area of light to be read. At the present time, there is no completely satisfactory commercial apparatus for performing the functions described above.

Accordingly, the principles and objects of the present invention are concerned with the provision of an improved light gun which is comparatively simple in construction and is highly efficient and sensitive in operation.

In brief, a light gun embodying the invention includes optical means for generating a circle of light which is used to encircle a light area to be read on a cathode ray tube. This optical means also is adapted to read the signal light and transmit it into the body of the gun where it is converted into an electrical signal which may be transmitted to and utilized in other auxiliary apparatus. The various parts of the gun are designed and constructed to provide optimum sensitivity and efficiency.

The invention is described in greater detail by reference to the drawing wherein:

FIG. 2 is a side elevational view, partly in section, of the light gun of FIG. 1;

FIG. 3 is a sectional view along the lines 3—3 in FIG. 2;

FIG. 4 is a side elevational view, partly in section, of the light gun of FIG. 1 and showing components carried by one portion of the stock of the gun;

FIG. 5 is an exploded view of a portion of the light gun of the invention showing the shutter mechanism thereof;

FIG. 6 is a side elevational view, partly in section, of the light gun of FIG. 1, and showing components carried by the other portion of the stock of the gun other than that shown in FIG. 4; and FIG. 7 is a plan view of the stock of the light gun of FIG. 1 with the barrel removed and light-producing assembly removed.

Figure 1:
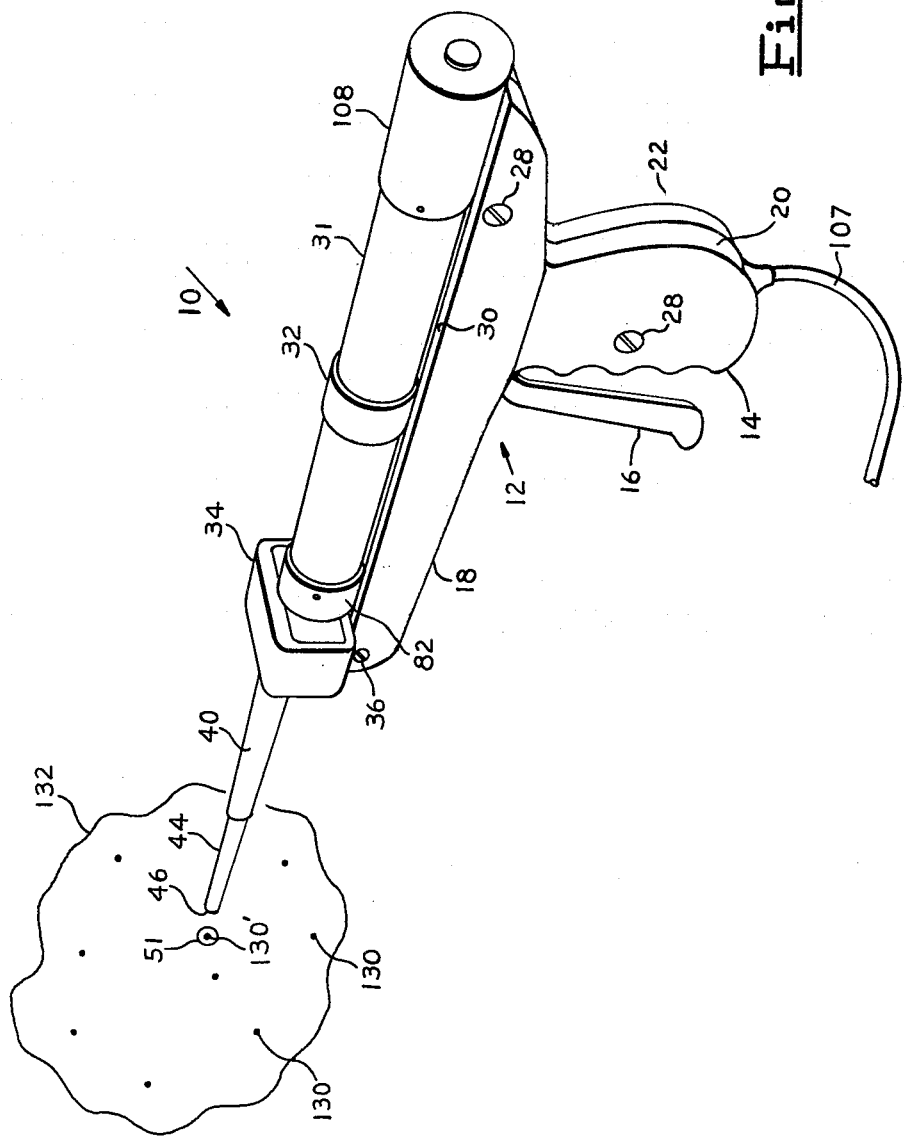
FIG. 1 is a perspective view of a light gun embodying the invention and apparatus with which it is used.

Referring to FIGS. 1 and 2, a light gun 10 embodying the invention is generally in the form of a pistol and includes a conventionally shaped pistol housing 12 comprising a hand grip 14, a trigger 16, and a stock 18. The housing comprises two mating portions 20 and 22 which are hollowed out to receive and house various electrical and mechanical components of the apparatus to be described. The two mating portions 20 and 22 are secured together by a plurality of removable fasteners such as bolts 28 and, together, provide a flat top surface 30 on which a hollow tubular barrel 31 is mounted. The barrel may be of metal or an insulating material and is held in position on the surface 30 by a metal strip 32 which surrounds the barrel, extends between the portions 20 and 22 into the housing, and is secured to one of the portions 20 or 22 by a suitable fastener 33.

The light gun 10 includes means for generating a circle of light and means for receiving information or signal light. These means include a light housing 34 which is secured to the stock 18 by one or more suitable fasteners 36. The light housing 34 includes a central aperture 38 in which is mounted a tapered cylinder 40 of any suitable material, for example a synthetic resin such as Lucite or the like having an axial bore 42. A solid rod 44 of Lucite or the like, and having a circular cross-section, is disposed within the bore of the cylinder 40 and extends beyond the front end thereof. The rod 44 has flat polished front and rear ends 46 and 48 (FIGS. 1 and 2), respectively, to allow light to pass directly into and out of the rod. The rear end 46 of the rod 44 terminates at about the rear surface 50 of the Lucite cylinder 40. The outer surface of the cylinder 40 is painted black to improve the resolution of a circle of light which is transmitted along the rod as described below. The rod 44 has a smooth polished surface which is painted black or otherwise rendered opaque to prevent light from passing into or out of the rod through its surface. The opaque outer surface also prevents light reflection, and it promotes the absorption of scattered light within the cylinder 40.

Adjacent to the rear end of the rod 44 is provided light-producing means for directing light through cylinder 40 and along the rod 44 to its front end, where it appears as a circle of light 51 (FIG. 1). This means (FIGS. 2 and 3) comprises two small incandescent bulbs 52 and 54 which are disposed on opposite sides of the rod 44 with their front ends adjacent to the rod and their axes horizontally aligned transverse to the axis of the rod. The bulbs are mounted in apertures in the cylinder 40 and each bulb has two electrical contact elements 58, 60 and 62, 64 with the necessary lead wires 66 and 68 secured thereto. Electrical connection to the bulbs 52 and 54 may, of course, be made in any suitable manner.

The Lucite rod 44 is aligned with a shutter mechanism for passing light received from the rod into the barrel 18. The shutter mechanism is made up of three disks 72, 74, and 76 (FIGS. 4 and 5) seated in a suitable annular groove or grooves 78 in the inner wall 80 of a cylindrical housing 82 which engages the front end of the barrel 31. The disks may be mounted with adjacent ones touching, and, for ease of operation, the two outer disks 72 and 76 are made of a stiff fibrous material, and the center disk 74 is made of cold rolled steel. The three disks are oriented in a stack parallel to each other and transverse to the axis of the rod 44. The disks are held in position by means of a pin 84 passing through their centers and suitably secured to the housing 82. The two outer disks 72 and 76 are adapted to be fixed in position and form a tight fit with the wall of housing 82, while the inner disk 74 is adapted to rotate about the pin 84 so that it can occupy two positions. The three disks are provided with apertures 86, 88, 90, respectively, with the apertures 86 and 90 in the outer fixed disks 72 and 76 axially aligned. The center disk 74 is adapted to be rotated so that it occupies two positions, in one of which its aperture 88 is aligned with the other apertures and the shutter is open, and in the other of which, its aperture is not aligned with the others and a solid portion of its body lies between the apertures in the outer disks.

In the latter orientation of the disks, the shutter is closed.

A bent spring 91 is coupled between the movable center disk 74 and the outer disk 76 to urge the center disk back to its neutral position after it has been moved to align the apertures 86, 88, and 90 in the three disks. The spring 91 has a hook-like process 92 at one end which engages an auxiliary aperture 93 in the center disk, and the body of the spring lies in a hollowed-out portion of the outer disk. The other end of the spring is provided with a hook-like process 94 which suitably engages the edge or other portion of the outer disk. The center disk 74 is adapted to be rotated by the following apparatus.

The center disk 74 has a smaller diameter than the outer disks 72 and 76, and a wire cable 96 is wound about its periphery and held in place between the outer disks 72 and 76. One portion of the cable 96 which is wound around the disk is soldered or otherwise secured to the disk and from this connection, the cable is looped around the disk, passed over a guide roller 98, through a coiled spring 100 and through an eyelet 101 to which it is secured. The cable also passes over one or more auxiliary guide rollers 102, 104 to a firm connection to the trigger 16. The spring 100 has one end secured to the eyelet 101 and the other end suitably secured to the housing member 22.

The shutter disks 72, 74, 76, the cable 96 and the trigger 16 are adjusted so that in the neutral position of the trigger, the shutter is closed, and in the maximum "squeezed" position of the trigger, the shutter is open. The spring 100 aids the return of the trigger to its normal position after it has been squeezed to open the shutter.

Rearwardly of the shutter and lying in the barrel 31 is a photomultiplier tube 106 of any suitable type for receiving light through the shutter and generating an electrical signal therefrom. The output of the photomultiplier is coupled to one or more amplifiers (not shown) which may also be provided in the barrel and the electrical output of the light gun is coupled through suitable leads 107 which extend through the hand grip 14 and out of the end of the grip to be connected to any suitable utilization apparatus (not shown). A suitable cylindrical cap 108 closes the rear end of the barrel 31 and is suitably secured to the housing 12.

The trigger 16 serves to both operate the shutter and to turn on the light bulbs 52 and 54. To perform the latter function, referring to FIGS. 2, 5, 6, and 7, a microswitch 110 is provided mounted in, and suitably secured to, the housing 12 rearwardly of the trigger 16. The microswitch includes a contact button 112 and a resilient spring arm 114 which lies above, and is adapted to be moved into contact with, the button 112. A guide plate 116 is provided for use in actuating the switch. The guide plate is suitably secured to the inner wall of the housing and overlays the spring arm. The guide plate has an aperture 118 which is aligned with the free end 120 of the spring arm. A link 122 is provided pivotally secured at one end to the trigger and having at its other end a projection 126 which is adapted to fall into the aperture 118 in plate 116. The parts are designed and arranged so that, when the trigger is operated, the projection 126 on the link 122 drops into the aperture 118 and into contact with the end 120 of the spring arm 114. The weight of the link on the spring arm forces the arm into contact with the button 112 whereby the switch is closed. When the switch is closed, the bulbs 52 and 54 are turned on and light passes through cylinder 40 and along the surfaces of rod 44 to the end of the rod where it appears as the fine circle of light 51 (FIG. 1). Suitable electrical lead connections, including leads 66 and 68, are made to the switch 110 in well-known fashion. This same movement of the trigger 16 pulls the cable 96 and causes the center disk 74 of the shutter mechanism to move so that the apertures 86, 88, 90 are aligned and the shutter is opened.

In operation of the light gun 10, assuming that blips of light 130 on a radar screen 132 are to be read, the gun is aimed at a selected blip 130' and the trigger 16 is operated to turn on bulbs 52 and 54 and to open the shutter mechanism. The bulbs transmit light through cylinder 40 and along the rod 44, and circle of light 51 appears on the screen surrounding the light blip 130' to be read. At the same time, light from the blip 130' enters the rod 44 and travels along the rod and through the open shutter to the photomultiplier tube which generates an electrical signal therefrom. This electrical signal may then be utilized in any suitable fashion to operate other electrical apparatus.

The light gun is designed to have optimum selectivity, sensitivity, and efficiency in operation. With respect to the light-generating and transmitting portion of the gun, the tapered member 40 is designed to allow only light rays which are parallel to the surface of rod 44 to pass through its open end and along the Lucite rod 44, from which the light rays leave as circle of light 51. With such an arrangement, the diameter of circle 51 is constant, regardless of the distance of the light gun 10 from screen 132. The nature of the material of cylinder 40 and its index of refraction determine the required taper of the cylinder to insure that only light rays which are parallel to rod 44 leave the end of the cylinder. The sensitivity of the light-receiving rod, that is, its ability to reject ambient light, depends primarily on the diameter of the aperture in the shutter mechanism, with the sensitivity increasing as the area of the aperture is decreased. The electrical circuit associated with the light gun may also be adjusted to affect its selectivity and sensitivity. In addition, the ability of the rod 44 to exclude light from blips close to the blip to be read depends on the material of the rod, its length and diameter. In one form of the light gun 10, the rod had a diameter of ⅛ inch and was about five inches long. Such a rod of Lucite accepts, at its reading end, light which lies within a comparatively small area. Light outside this area either does not enter the rod or, if it enters, it is reflected from side to side as it passes along the rod and is ultimately absorbed by the black coating on the outer surface thereof.

What is claimed is:

1. A light gun comprising a solid elongated member for transmitting externally along its length an identifying area of light and applying it to a body, the shape of the area of light being determined by the cross-sectional shape of the member, said member also being adapted to receive light at its front end and transmit it along its length internally, light source means positioned adjacent to said member near one end thereof and positioned so that light therefrom flows along the length of the member to its front end whence it is applied to a surface, a light shutter mechanism adjacent to the rear end of said member and adapted to pass light transmitted internally in said member, and light-responsive electrical circuit means coupled to said shutter mechanism.

2. The light gun defined in claim 1 and including common means coupled and adapted to actuate both said light source and said shutter mechanism substantially simultaneously.

3. A light gun comprising a housing; a light source in said housing; light-transmitting and receiving means coupled to said light source for transmitting light from said housing onto a surface and for receiving signal light from said surface and transmitting it back into said housing, said light-transmitting and receiving means including a rod member positioned in said housing and having a portion extending out of said housing and a cylinder of light-transmitting material surrounding said rod member and a source of light adjacent to said rod within said cylinder, the light transmitted through said cylinder and parallel to said rod being circular in shape and adapted to encircle signal light to be read; light-responsive electronic means in said housing coupled to said rod member and adapted to produce an electrical signal in response to signal light received thereby; and a shutter mechanism disposed between said light-transmitting and receiving means and said light-responsive electronic means for controlling the transmission of signal light to said last-named means.

4. A light gun comprising a housing; a light source in said housing; light-transmitting and receiving means coupled to said light source for transmitting light from said housing onto a surface and for receiving signal light from said surface and transmitting it back into said housing, said light-transmitting and receiving means including a rod member positioned in said housing and having a portion extending out of said housing and a cylinder of light-transmitting material surrounding said rod member and a source of light adjacent to said rod within said cylinder, the light transmitted through said cylinder and parallel to said rod being circular in shape and adapted to encircle signal light to be read; light-responsive electronic means in said housing coupled to said rod member and adapted to produce an electrical signal in response to signal light received thereby; a shutter mechanism disposed between said light-transmitting and receiving means and said light-responsive electronic means for controlling the transmission of signal light to said last-named means; and actuating means coupled both to said source of light and said shutter mechanism for turning on said light source and opening said shutter at the same time.

References Cited in the file of this patent
UNITED STATES PATENTS

| | | |
|---|---|---|
| Re. 25,258 | Asten | Oct. 9, 1962 |
| 1,931,552 | Maris | Oct. 24, 1933 |
| 2,113,450 | Lasky et al. | Apr. 5, 1938 |
| 2,420,716 | Morton et al. | May 20, 1947 |
| 2,755,390 | Teichmann | July 17, 1956 |
| 2,816,705 | Thrall et al. | Dec. 17, 1957 |
| 2,838,683 | Munro | June 10, 1958 |
| 2,877,453 | Mendenhall | Mar. 10, 1959 |
| 2,903,690 | Slack | Sept. 8, 1959 |
| 2,964,640 | Wippler | Dec. 13, 1960 |